(12) United States Patent  (10) Patent No.: US 9,228,876 B2
Hauzeray  (45) Date of Patent: Jan. 5, 2016

(54) LIQUID SENSOR USING TEMPERATURE COMPENSATION

(75) Inventor: Sylvain Hauzeray, Plaisir (FR)

(73) Assignee: Zodiac Aerotechnics, Plaisir (FR)

( * ) Notice: Subject to any disclaimer, the term of this patent is extended or adjusted under 35 U.S.C. 154(b) by 466 days.

(21) Appl. No.: 13/610,985

(22) Filed: Sep. 12, 2012

(65) Prior Publication Data

US 2013/0061670 A1  Mar. 14, 2013

Related U.S. Application Data

(60) Provisional application No. 61/533,831, filed on Sep. 13, 2011.

(51) Int. Cl.
  *G01F 23/24* (2006.01)
  *G01F 23/00* (2006.01)

(52) U.S. Cl.
  CPC .......... *G01F 23/247* (2013.01); *G01F 23/0061* (2013.01); *G01F 23/243* (2013.01); *G01F 23/244* (2013.01)

(58) Field of Classification Search
  CPC . G01F 23/0061; G01F 23/243; G01F 23/244; G01F 23/247
  See application file for complete search history.

(56) References Cited

U.S. PATENT DOCUMENTS

| 4,276,536 A | 6/1981 | Wisnia |
| 4,416,153 A | 11/1983 | Williams |
| 5,421,202 A | 6/1995 | Le Pimpec |
| 5,475,235 A * | 12/1995 | Phillips et al. ................ 250/574 |
| 6,662,650 B1 | 12/2003 | Durkee et al. |
| 6,758,084 B2 | 7/2004 | Hall |
| 6,822,460 B2 | 11/2004 | Pelkey |
| 2008/0083275 A1 | 4/2008 | Bremmer et al. |

FOREIGN PATENT DOCUMENTS

CH  564762  7/1975

OTHER PUBLICATIONS

International Search Report and Written Opinion dated Dec. 13, 2012 in Application No. PCT/IB2012/054741.

* cited by examiner

*Primary Examiner* — Paul West
(74) *Attorney, Agent, or Firm* — Kilpatrick Townsend & Stockton LLP; Dean W. Russell, Esq.; Jason D. Gardner, Esq.

(57) ABSTRACT

A liquid sensor system can detect whether liquid is present at a location within a tank or other container, such as an aircraft fuel tank. The system can include a sensor that has a heated negative temperature coefficient (NTC) element and a temperature compensator element. The sensor may be located within the tank. The elements can be polarized by voltages from separate voltage sources. The voltages can be compared to detect a presence or level of liquid within the tank. Only two wires may be needed to connect the sensor with components outside the tank. The system may be able to detect liquid using less than twenty five milliamps and a sensor temperature that is less than two hundred degrees Celsius.

19 Claims, 8 Drawing Sheets

LIQUID SENSOR USING TEMPERATURE COMPENSATION

CROSS-REFERENCE TO RELATED APPLICATIONS

This application claims priority to U.S. Provisional Application Ser. No. 61/533,831, titled "Two Wire Liquid Sensor Using Temperature Compensation," and filed Sep. 13, 2011, the entirety of which is incorporated herein by reference.

TECHNICAL FIELD OF THE INVENTION

The present invention relates generally to assemblies for sensing liquid in a tank or other container and, more particularly (although not necessarily exclusively), to sensing liquid while compensating for temperature.

BACKGROUND

A level of liquid can be detected using a heated negative temperature coefficient (NTC) resistor. For example, U.S. Pat. No. 5,421,202 to Pimpec relates to a sensor that includes a probe including an NTC resistor and a positive temperature coefficient resistor connected in series. A constant current is delivered to the probe and a total resistance of the resistors is compared with a threshold to detect whether liquid is present at a location in a tank. Some liquid level detection systems use a self-heating thermistor probe (e.g. U.S. Pat. No. 4,276,536). U.S. Pat. No. 4,416,153 to Williams is another example of a method that includes comparing voltage levels to thresholds.

A dual thermistor bead sensor can be used to detect a level of liquid. For example, U.S. Pat. No. 6,662,650 to Durkee, et al. relates to conducting different currents through different thermistor beads, measuring voltages across the thermistor beads, generating signals from the voltage measurements, modifying one of the signals by an offset and gain, and detecting a dry/wet state of the sensor based on the modified signal and another generated signal. U.S. Pat. No. 6,758,084 to Hall is another example.

Liquid level detection methods as in the examples are useful in limited temperature ranges. When the temperature range is large, and the environment is potentially explosive, present solutions may not be fully satisfactory.

Other methods and apparatus compensate a thermistor bead for temperature. U.S. Pat. No. 6,822,460 to Pelkey relates to detecting a dry/wet state of a thermistor bead using temperature compensation. A thermistor bead is disposed at a height in a fuel tank. A temperature sensor is disposed in the fuel tank and can measure a temperature in proximity to the thermistor bead. One circuit conducts a constant bias current of less than thirty milliamps into the fuel tank and through the thermistor bead. A second circuit generates a reference voltage in proportion to the measured temperature of the sensor. A third circuit measures a voltage across the thermistor bead in response to the bias current, and can detect the dry/wet state of the thermistor bead based on the measured and reference voltages.

Methods using temperature compensation, however, may require several wires and sophisticated electronics, such as current sources providing polarization current.

In some environments in which a tank is located—such as in an aircraft—weight is a concern, as is the presence of several wires. It is also desirable for tank components to be simple for reliability, compatibility, accessibility purposes. A system using an NTC polarized by current, in contrast, may use a current source that is relatively complex to design.

In connection with aircraft, the Federal Aviation Administration (FAA) recently defined an acceptable maximum current and maximum temperature for in aircraft tank applications. These values are twenty five milliamps and two hundred degrees Celsius, respectively. Liquid sensor systems are desirable that can operate within these requirements and that involve simple-to-design components and fewer wires.

SUMMARY

Certain aspects of the present invention are directed to system including a sensor for detecting whether liquid is present at a location in a tank, such as an aircraft fuel tank, using temperature compensation. The sensor can include a negative temperature coefficient (NTC) element and a temperature compensation element that are polarized by voltages from different voltage sources. The number and complexity of the components needed to implement the system may be reduced and FAA requirements can be met.

One aspect relates to a system that includes a sensor and comparison circuitry. The sensor can be in a tank that can contain liquid. The sensor can include an NTC element and a temperature compensator element. The NTC element can be polarized by a first voltage source through a first resistor. The temperature compensator element can be polarized by a second voltage source through a second resistor. The comparison circuitry can be outside the tank. The comparison circuitry can determine a dry/wet state within the tank by comparing voltages across the NTC element and the temperature compensator element.

Another aspect relates to a liquid sensor system that includes a sensor, a modulator, a demodulator, and comparison circuitry. The sensor can be within a tank. The modulator, demodulator, and comparison circuitry can be outside the tank. The sensor can include a heated NTC element and a temperature compensator element. The modulator can modulate voltages for polarizing the heated NTC element and the temperature compensator element. The demodulator can extract the voltages across the heated NTC element and the temperature compensator element. The comparison circuitry can determine a dry/wet state within the tank by comparing the voltages across the heated NTC element and the temperature compensator element.

Another aspect relates to a system that includes a sensor, polarization circuitry, and measurement circuitry. The sensor is within a tank adapted to contain liquid. The sensor can include a heated NTC element and a temperature compensator element. The polarization circuitry is outside the tank and connected to the sensor by only two wires. The polarization circuitry can provide polarization voltages to the sensor from separate voltage sources. The measurement circuitry is outside the tank and can determine a dry/wet state within the tank by comparing voltages across the heated NTC element and the temperature compensator element.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Certain aspects and features relate to a liquid sensor system for detecting whether liquid is present at a location within a tank or other container, such as an aircraft fuel tank. The system can include a sensor, or probe, that includes a negative temperature coefficient (NTC) element and a temperature compensator element. The sensor may be located within the tank. The elements can be polarized by voltages from separate voltage sources. The voltages can be compared to detect a presence or level of liquid within the tank. An example of the sensor is a thermistor.

In some aspects, the NTC element is a heated NTC resistor. The system can include modulation circuitry for modulating voltages to polarize the elements. Some examples also include multiplexing circuitry to multiplex the modulated voltages on a wire. The sensor may include or be associated with a demultiplexer that can extract the voltages for the elements. The sensor and demultiplexer can be connected by two wires to system components outside the tank, reducing the number of wires needed to implement the liquid sensor system.

The temperature compensator element may not be a heated NTC. The temperature compensator element may have a resistive value that is independent of fluid (e.g. air or fuel) contact such that the resistance value is only a function of the temperature such that there is no heating. The variation due to fluid may be negligible.

Current through the system according to various aspects can be less than twenty five milliamps and the sensor temperature can be less than two hundred degrees Celsius.

Certain aspects simplify the calculation of electric parameters by having a fixed current, with resistance and voltage varying. In other aspects, a voltage generator may be used as a voltage source to polarize the NTC element through a resistor with resistance, voltage, and current being variable. A voltage generator may be more straightforward to implement than a current source in previous systems, and complexity can be compensated by present simulation tools.

These illustrative aspects and examples are given to introduce the reader to the general subject matter discussed here and are not intended to limit the scope of the disclosed concepts. The following sections describe various additional features and examples with reference to the drawings, but, like the illustrative aspects, should not be used to limit the present invention.

Figure 1:
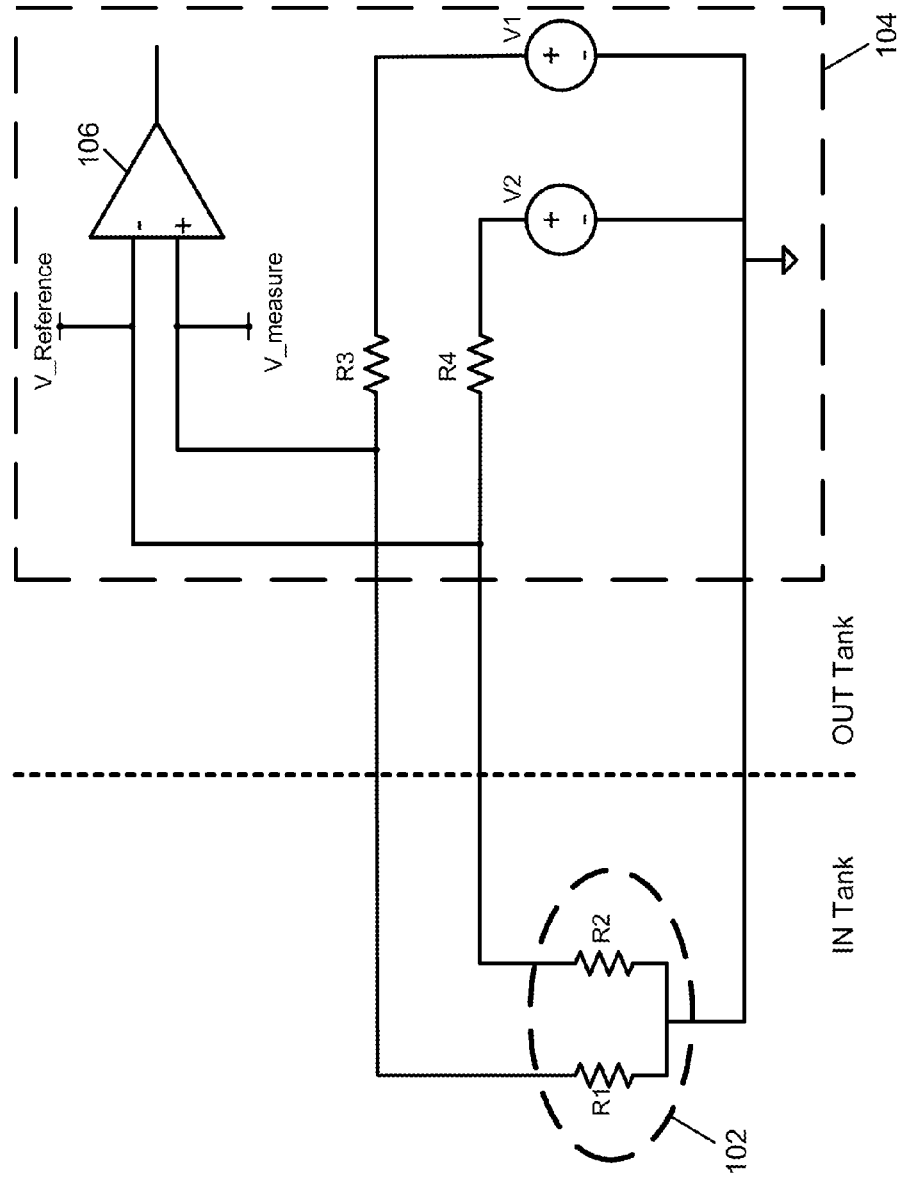
FIG. 1 is schematic diagram of a three-wire liquid sensor system with temperature compensation according to one aspect of the present invention.

FIG. 1 depicts a liquid sensor system according to one aspect. The liquid sensor system includes a sensor 102 within a tank and electronic measurement circuitry 104 outside, or external to, the tank. A dashed vertical line in FIG. 1 represents a divider between components within the tank and components outside the tank.

The sensor 102 includes two elements R1, R2. Element R1 may be a heated NTC thermistor having a value that is dependent on temperature and the thermal properties of fluid (e.g. air or fuel) within the tank. In other aspects, element R1 is an NTC thermistor. Element R2 may be temperature compensator element, such as a Resistance Temperature Dependent (RTD) thermistor having a resistance that changes as a function of temperature.

The electronic measurement circuitry 104 can include voltage sources V1, V2, resistors R3, R4, and a comparator 106. Voltage sources V1, V2 may be direct current (DC) voltage sources. In some aspects, the voltage sources V1, V2 are separate voltage sources that can provide polarizing voltages. In other aspects, the voltage sources V1, V2 are integrated into a single device that can output separate voltages. The comparator 106 may be any device that can compare two voltages and output a signal or value that can represent a wet/dry state within the tank.

Elements R1, R2 can be polarized by voltages from separate voltage sources V2, V1 through separate resistors R3, R4. Element R1 can be polarized by a voltage from voltage source V1 through resistor R3. Element R2 can be polarized by a voltage from voltage source V2 through resistor R4.

The voltages across elements R1, R2 can be compared by the comparator to output a value representing the wet/dry state within the tank. For example, the voltage across element R1 may be a measurement voltage (labeled in FIG. 1 as "V_measure") and the voltage across element R2 may be a reference voltage (labeled in FIG. 1 as "V_Reference").

Figure 2:
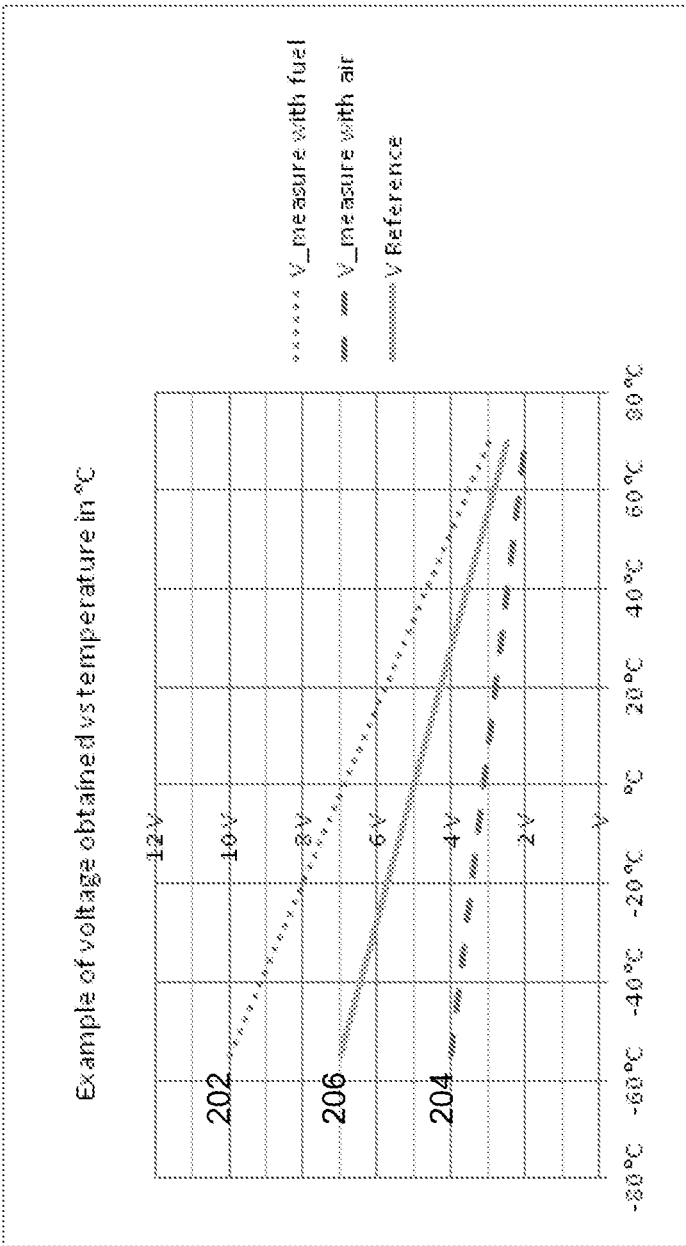
FIG. 2 is a chart of voltages with respect to temperature according to one aspect of the present invention.

FIG. 2 depicts examples of voltages at V_measure and V_Reference with respect to temperature. Line 202 represents voltage at V_measure when element R1 is substantially in fuel within the tank. Line 204 represents voltage at V_measure when element R1 is substantially in air within the tank. Line 206 represents V_Reference. Systems according to some aspects can be configured such that line 206, representing V_Reference, is between lines 202, 204. For example, tolerances of components can be taken into account such that the parameters of elements R1, R2 can be selected to cause line 206 to be between lines 202, 204.

Figure 3:
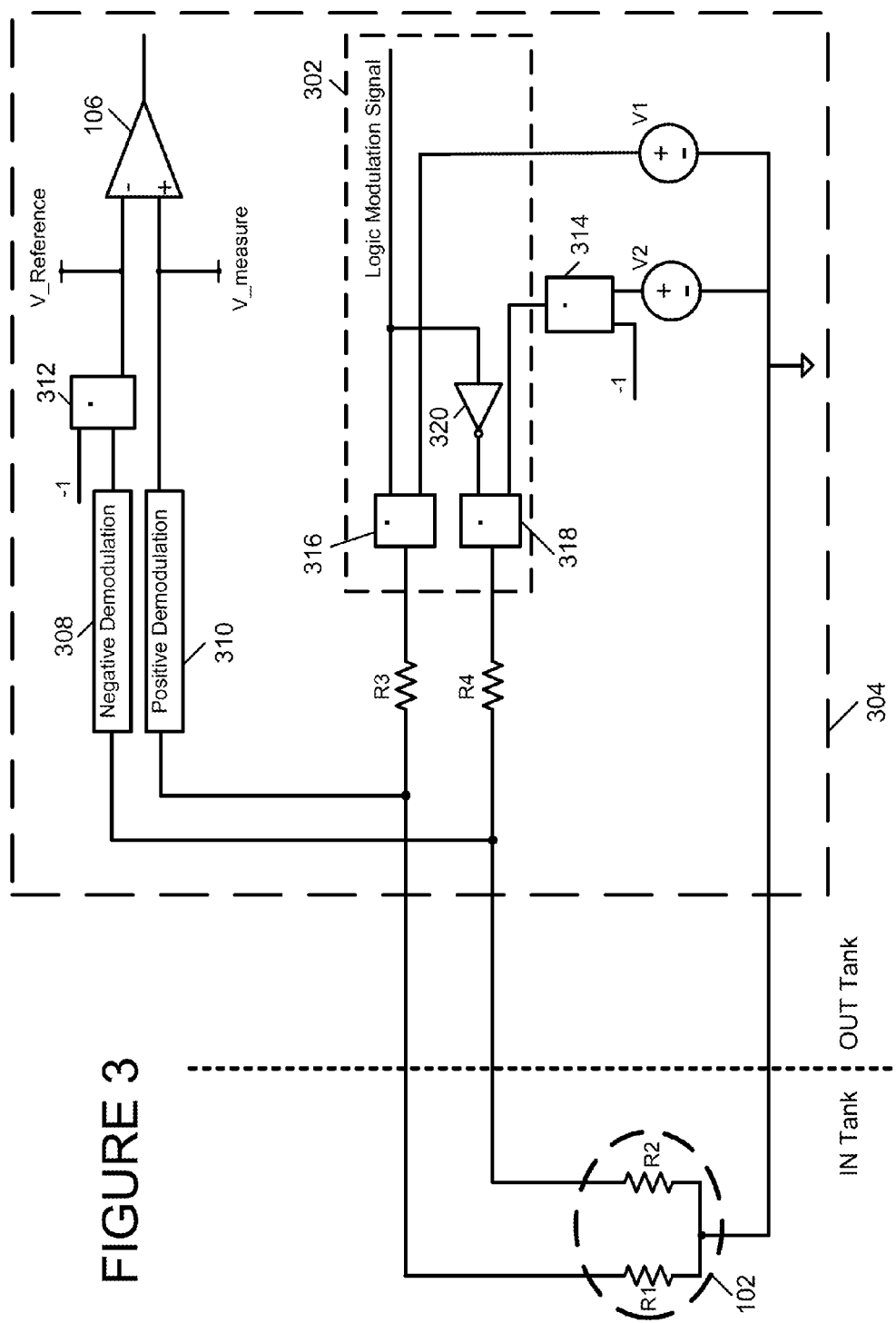
FIG. 3 is a schematic diagram of a liquid sensor system using signal modulation according to one aspect of the present invention.

In other aspects, polarizing voltages can be modulated. FIG. 3 depicts another aspect of a liquid sensor system that includes modulation circuitry 302 in electronic measurement circuitry 304. The electronic measurement circuitry also includes voltage sources V2, V1, resistors R3, R4, comparator 106, negative demodulation device 308, positive demodulation device 310, and multiplier devices 312, 314. The modulation circuitry includes multiplier devices 316, 318 and inverter 320.

A multiplier device may include circuitry that can multiply two or more inputs and provide one output that is a product of the inputs. An example of a multiplier device is a mixer. In some aspects, negative demodulation device 308 and positive demodulation device 310 are envelope detectors.

Voltage from voltage source V1 can be modulated in a positive waveform using a modulation technique. An example of a modulation technique is amplitude modulation, but other techniques, such as frequency modulation, can also be used. In multiplier device 316, voltage from voltage source V1 can be multiplied with a logic modulation signal that may be provided by, or received from, any source that can provide a modulation signal. The output of the multiplier device 316 may be a polarization signal for element R1. The polarization signal can represent the voltage from voltage source V1.

Voltage from voltage source V2 can be modulated in a negative waveform. Voltage from voltage source V2 can be multiplied by multiplier device 314 with an inverting value, such as negative one. The output of multiplier device 314 may be the inverse of the voltage from voltage source V2. The inverse of the voltage from voltage source V2 can be multiplied by multiplier device 318 with an inverse of the logic modulation signal from inverter 320. The output of the multiplier device 318 may be a polarization signal for element R2 that can represent the voltage from voltage source V2.

In other aspects, voltage from voltage source V1 is modulated in a negative waveform and voltage from voltage source V2 is modulated in a positive waveform.

Voltages represented by the polarization signals can be demodulated using the negative demodulation device 308 and the positive demodulation device 310. The output of the negative demodulation device 308 can be multiplied by multiplier device 312 with an inverting value, such as negative one, to invert the voltage back. The output of the multiplier device 312 can be compared to the output of the positive demodulation device 310 by comparator 106. The output of the comparator 106 can represent the wet/dry state within the tank.

Although depicted as separate devices, negative demodulation device 308 and positive demodulation device 310 may be circuitry in a single device in other aspects.

Figure 4:
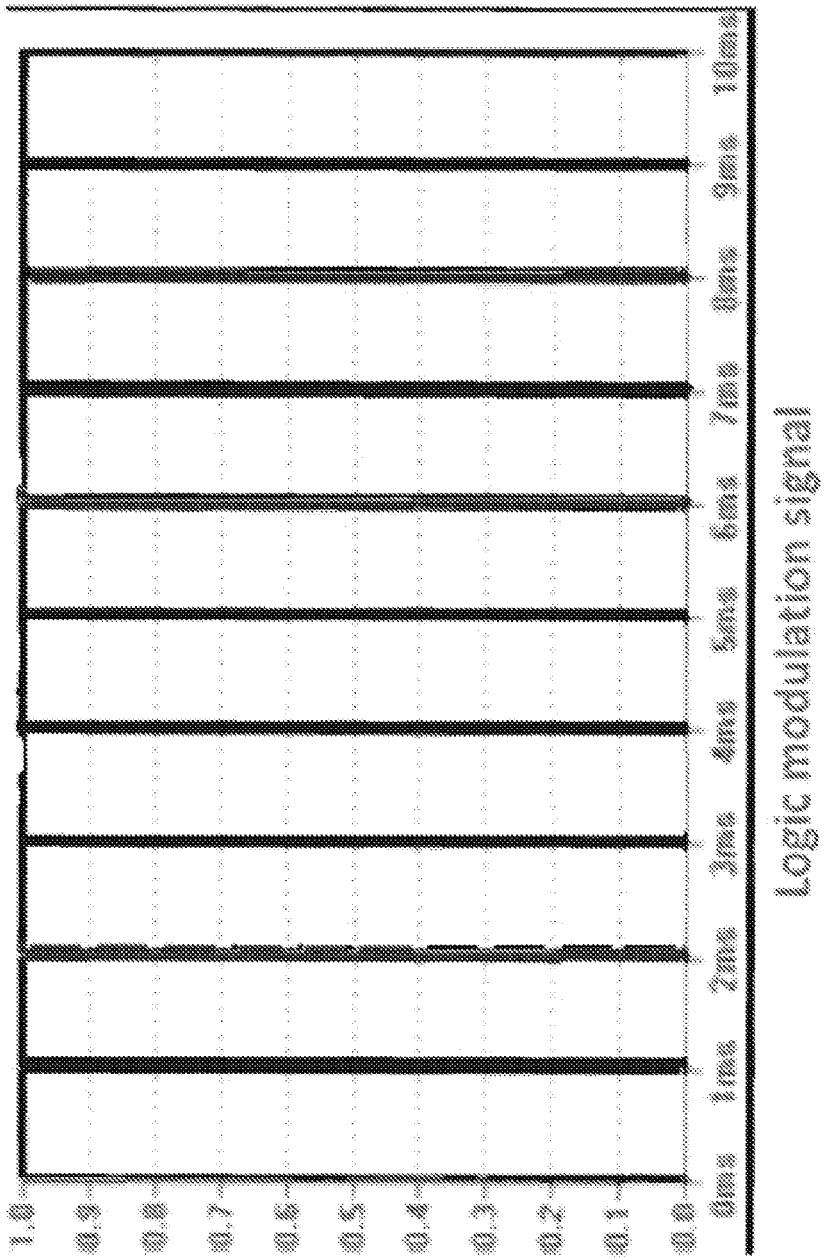
FIG. 4 depicts an example of a logic modulation signal according to one aspect of the present invention.

FIG. 4 depicts an example of a logic modulation signal according to one aspect. Two parameters of the logic modulation signal include the period and the modulation ratio between reference and measured values. The period may define the time to refresh data. The ratio may define time sharing between the two signals. In some aspects, a ratio in the range of ninety to less than one hundred percent provides a suitable balance. For example, measured may be ninety-five percent and the reference five percent.

Figure 5A:
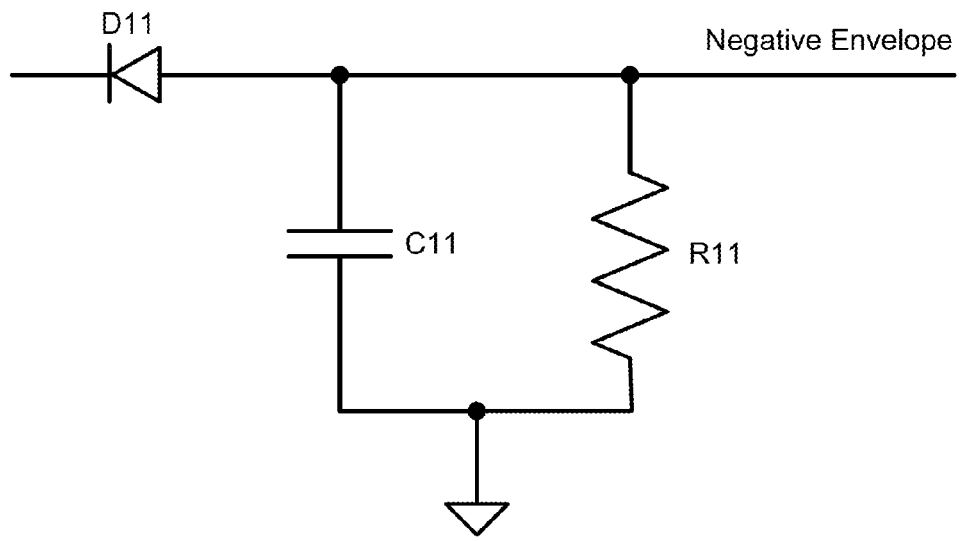
FIG. 5A is a schematic of a negative envelope detector according to one aspect of the present invention.
Figure 5B:
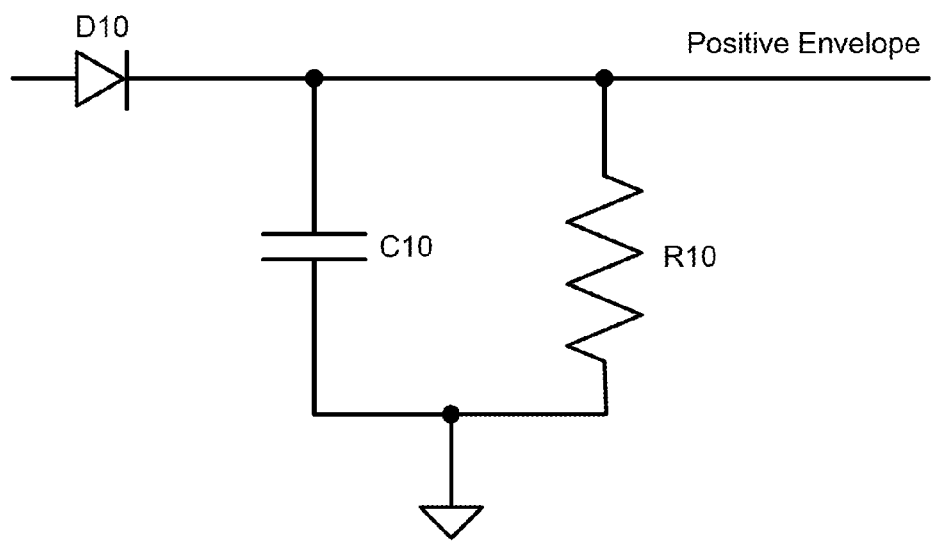
FIG. 5B is a schematic of a positive envelope detector according to one aspect of the present invention.

FIGS. 5A and 5B depict examples of circuitry for negative demodulation device 308 and positive demodulation device 310, respectively. The circuitry includes a resistor, a capacitor, and a diode. The diodes may be any unidirectional components. Diodes may be configured in opposite directions. The circuitry in FIGS. 5A and 5B can split the positive and negative voltage waveforms into two independent signals. Although two envelope detectors, one in positive and the other in negative, are depicted, other solutions may be used, with or without coherent demodulation.

Figure 6:
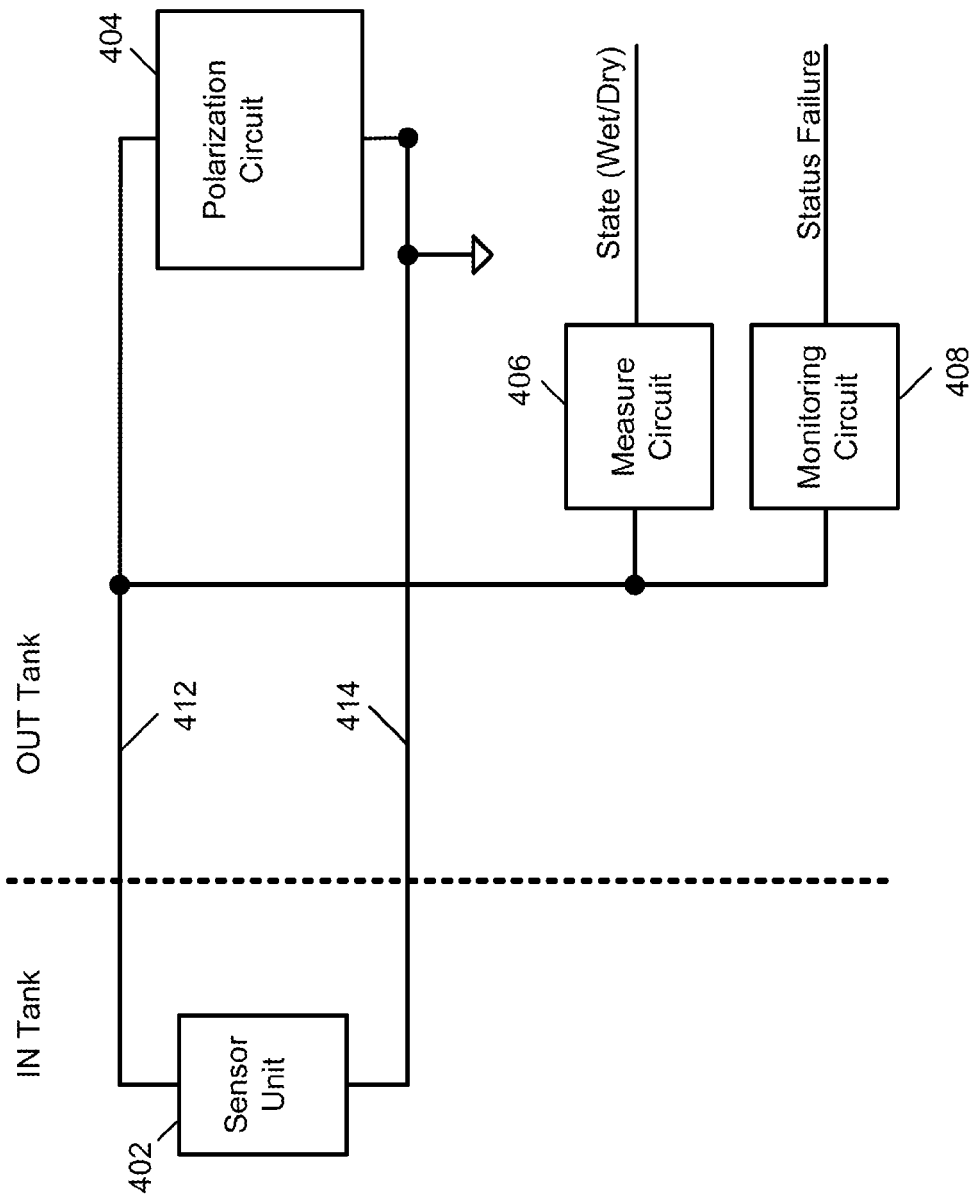
FIG. 6 is a block diagram of a two-wire liquid sensor system according to one aspect of the present invention.

A liquid sensor system according to some aspects may only use two wires connecting a sensor and/or other components within a tank with components outside the tank. FIG. 6 depicts a two-wire liquid sensor system according to one aspect. The system includes a sensor unit 402, a polarization circuit 404, a measure circuit 406, and a monitoring circuit 408. The sensor unit 402 can be within the tank and the other components can be outside the tank. The sensor unit 402 can connect to the other components using two wires 412, 414. For example, wire 412 may allow voltage or polarization signal to be provided to the sensor unit 402 and wire 414 may be a ground wire.

The polarization circuit 404 can provide voltages from voltage sources in the polarization circuit 404. The measure circuit can compare voltages across elements in the sensor unit 402 to output a representation of a wet/dry date within the tank. The monitoring circuit 408 can be an independent measurement circuit that can also measure the voltages to calculate a failure status. For example, in the case of a short circuit or open circuit of the sensor unit 402, the monitoring circuit 408 can detect a failure of the sensor unit 402 and output a status indicating a failure.

Figure 7:
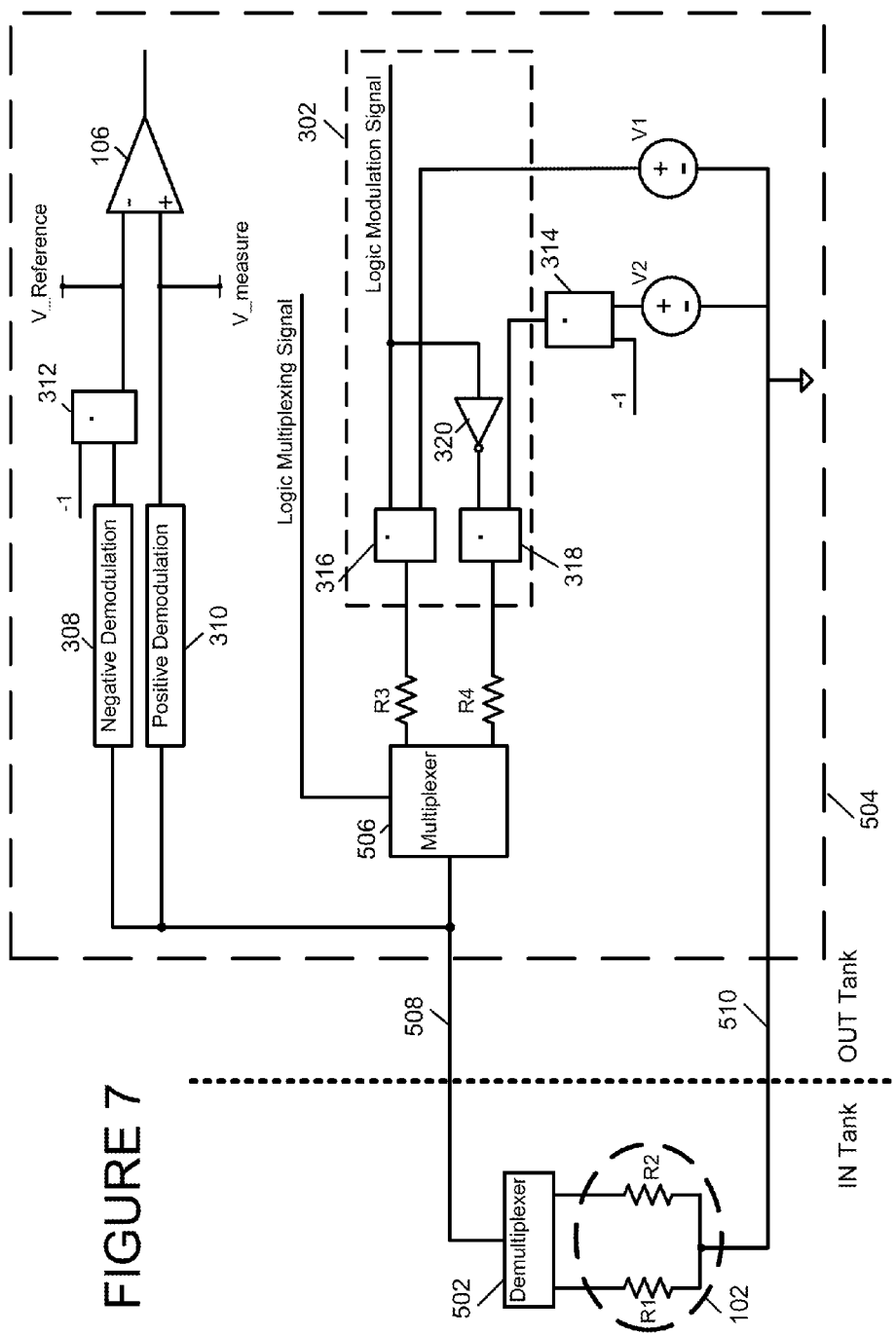
FIG. 7 is a schematic of a two-wire liquid sensor system according to one aspect of the present invention.

FIG. 7 schematically depicts a two-wire liquid sensor system according to one aspect. The system includes the sensor 102 and a demultiplexer 502 within the tank. The system also includes electronic measurement circuitry 504 outside of the tank. The electronic measurement circuitry 504 includes the components in electronic measurement circuitry 304 of FIG. 3 and a multiplexer 506 that can receive a logic multiplexing signal. Two wires 508, 510 connect the sensor 102 and demultiplexer 502 with components outside of the tank.

In the example depicted in FIG. 7, polarization signals from the modulation circuitry 302 through resistors R3, R4 are multiplexed by multiplexer 506 using time-division multiplexing into a multiplexed signal that includes representations of voltages from voltage source V1 and voltage source V2. Wire 508 can transport the multiplexed signal to the demultiplexer 502. The demultiplexer 502 can recover the polarization signals and provide each polarization signal to element R1 or element R2, as the case may be. Elements R1, R2 may be in series with the demultiplexer 502.

Resistors R3, R4 may limit current to twenty five milliamps or less in the case of a short circuit of the sensor. Modulation and multiplexing may allow the use of relatively simple electronic circuits for demultiplexing and demodulating.

Figure 8:
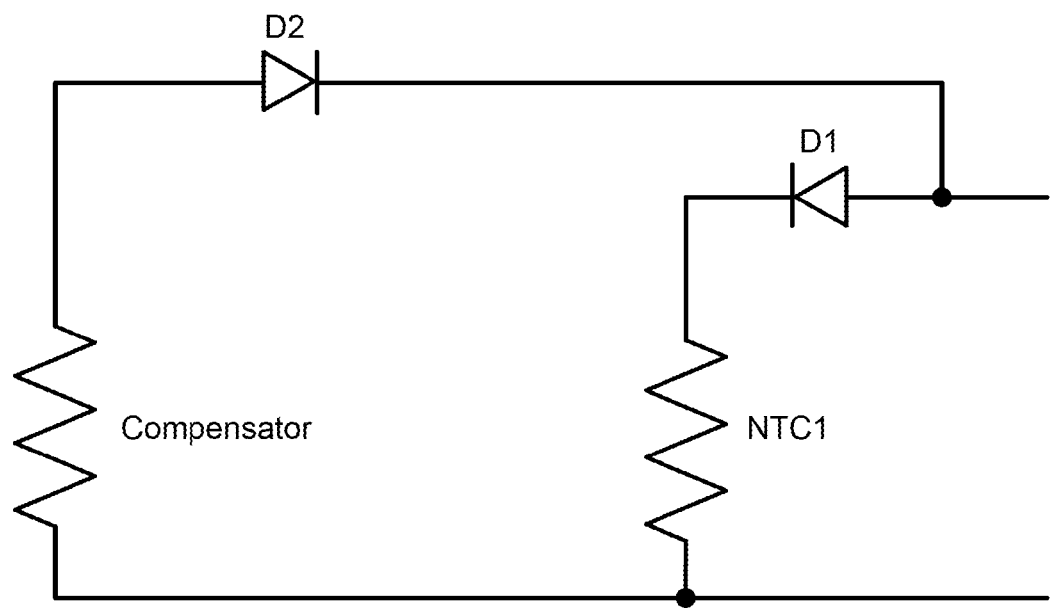
FIG. 8 is a schematic of a sensor according to one aspect of the present invention.

FIG. 8 schematically depicts a sensor and part of a demultiplexer according to one aspect. The sensor includes an NTC element (labeled as "NTC1") and a temperature compensator element (labeled as "Compensator"). The sensor elements are connected together by unidirectional components, such as diodes D1, D2 in opposite directions. The diodes D1, D2 may be part of the demultiplexer, such as demultiplexer 502 in FIG. 7, or separate components. The arrangement of the diodes D1, D2 in opposite directions can allow the operating of the NTC element for positive modulation and the temperature compensator element for negative modulation, or vice versa according to the configuration of the system.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A system for sensing liquid in a tank comprising:
   a sensor adapted to be within a tank configured to contain liquid, the sensor comprising:
      a negative temperature coefficient (NTC) element configured for being polarized by a first voltage source through a first resistor; and
      a temperature compensator element configured for being polarized by a second voltage source through a second resistor; and
   comparison circuitry adapted to be outside the tank, wherein the comparison circuitry is configured for determining a dry/wet state within the tank by comparing voltages across the NTC element and the temperature compensator element while maintaining the voltage across the NTC element and the first resistor and the voltage across the temperature compensator element and the second resistor.

2. The system of claim 1, wherein the NTC element is a heated NTC element,
   wherein the heated NTC element and the temperature compensator element are configured for being polarized using a polarization current that is less than 25 milliamps, wherein a temperature of the heated NTC element is less than 200 degrees Celsius independent of a temperature of an environment in which the tank is located.

3. The system of claim 1, further comprising the first resistor and the second resistor,
wherein in response to a short circuit, the first resistor and the second resistor are configured to limit current to less than 25 milliamps to tank wiring.

4. The system of claim 1, wherein the first voltage source and the second voltage source are direct current voltage sources.

5. The system of claim 1, wherein the temperature compensator element is a non-heated element and is configured to have a resistive value that is a function of temperature and is independent of fluid contact with the temperature compensator element.

6. The system of claim 1, further comprising:
a modulator configured for amplitude modulating voltages from the first voltage source and the second voltage source into a first polarization signal for the NTC element and a second polarization signal for the temperature compensator element; and
a demodulator configured for amplitude demodulating and extracting the voltages across the NTC element and the temperature compensator element from the first polarization signal and the second polarization signal.

7. The system of claim 6, further comprising:
a multiplexer adapted to be outside the tank, the multiplexer being configured for multiplexing the first polarization signal and the second polarization signal into a multiplexed signal; and
a demultiplexer adapted to be within the tank, the demultiplexer being configured for recovering the first polarization signal and the second polarization signal from the multiplexed signal, for providing the first polarization signal to the NTC element, and for providing the second polarization signal to the temperature compensator element.

8. The system of claim 7, wherein the demultiplexer is configured to be connected to components outside the tank by only two wires.

9. The system of claim 7, wherein the NTC element and the temperature compensator element are thermistors, the demultiplexer being in series with the NTC element and the temperature compensator element,
wherein the demultiplexer comprises unidirectional components in opposition on each branch in the demultiplexer.

10. The system of claim 9, wherein the unidirectional components comprise diodes.

11. The system of claim 6, wherein the demodulator comprises an envelope detector configured for coherent or non-coherent demodulation.

12. The system of claim 6, wherein the modulator is an amplitude modulation modulator.

13. The system of claim 1, further comprising:
monitoring circuitry outside the tank, the monitoring circuitry being configured for, independent of the comparison circuitry, measuring the voltages across the NTC element and the temperature compensator element and detecting a failure of the sensor.

14. An aircraft fuel tank comprising:
a tank for holding fuel for an aircraft; and
a system for sensing liquid in the tank, the system comprising:
a sensor adapted to be within the tank, the sensor comprising:
a negative temperature coefficient (NTC) element configured for being polarized by a first voltage source through a first resistor; and
a temperature compensator element configured for being polarized by a second voltage source through a second resistor; and
comparison circuitry adapted to be outside the tank, the comparison circuitry being configured for determining a dry/wet state within the tank by comparing voltages across the NTC element and the temperature compensator element while maintaining the voltage across the NTC element and the first resistor and the voltage across the temperature compensator element and the second resistor.

15. The aircraft fuel tank of claim 14, wherein the NTC element is heated NTC element,
wherein the heated NTC element and the temperature compensator element are configured for being polarized using a polarization current that is less than 25 milliamps,
wherein a temperature of the heated NTC element is less than 200 degrees Celsius independent of a temperature of an environment in which the tank is located.

16. The aircraft fuel tank of claim 14, further comprising the first resistor and the second resistor, wherein in response to a short circuit, the first resistor and the second resistor are configured to limit current to less than 25 milliamps to tank wiring.

17. The aircraft fuel tank of claim 14, wherein the first voltage source and the second voltage source are direct current voltage sources.

18. The aircraft fuel tank of claim 14, wherein the temperature compensator element is a non-heated element and is configured to have a resistive value that is a function of temperature and is independent of fluid contact with the temperature compensator element.

19. The aircraft fuel tank of claim 14, further comprising:
a modulator configured for amplitude modulating voltages from the first voltage source and the second voltage source into a first polarization signal for the NTC element and a second polarization signal for the temperature compensator element;
a demodulator configured for amplitude demodulating and extracting the voltages across the NTC element and the temperature compensator element from the first polarization signal and the second polarization signal;
a multiplexer adapted to be outside the tank, the multiplexer being configured for multiplexing the first polarization signal and the second polarization signal into a multiplexed signal; and
a demultiplexer adapted to be within the tank, the demultiplexer couplable to components outside the tank by only two wires and being configured for recovering the first polarization signal and the second polarization signal from the multiplexed signal, for providing the first polarization signal to the NTC element, and for providing the second polarization signal to the temperature compensator element.

* * * * *